US012620333B2

(12) United States Patent
Kang

(10) Patent No.: US 12,620,333 B2
(45) Date of Patent: May 5, 2026

(54) POWER MANAGEMENT CIRCUIT AND DISPLAY DEVICE INCLUDING THE SAME

(71) Applicant: SAMSUNG DISPLAY CO., LTD., Yongin-si (KR)

(72) Inventor: Kwanghun Kang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/912,983

(22) Filed: Oct. 11, 2024

(65) Prior Publication Data

US 2025/0131864 A1 Apr. 24, 2025

(30) Foreign Application Priority Data

Oct. 23, 2023 (KR) ........................ 10-2023-0141971

(51) Int. Cl.
*G09G 3/20* (2006.01)

(52) U.S. Cl.
CPC ........... *G09G 3/20* (2013.01); *G09G 2310/08* (2013.01); *G09G 2330/021* (2013.01); *G09G 2330/028* (2013.01)

(58) Field of Classification Search
CPC ........... G09G 2310/08; G09G 2330/06; G09G 2330/021; G09G 2300/0426
See application file for complete search history.

(56) References Cited

U.S. PATENT DOCUMENTS

| | | | | | |
|---|---|---|---|---|---|
| 5,585,749 | A * | 12/1996 | Pace | H03K 17/14 340/7.37 |
| 9,740,218 | B2 * | 8/2017 | Dagan | H02M 3/156 |
| 2020/0041561 | A1 * | 2/2020 | Alibert | H02J 3/0012 |
| 2023/0216416 | A1 * | 7/2023 | Jang | H02M 1/0048 |
| 2023/0360592 | A1 * | 11/2023 | Pyun | G09G 3/2096 |
| 2023/0396142 | A1 * | 12/2023 | Jung | H02M 1/0025 |
| 2024/0321169 | A1 * | 9/2024 | Tsuchi | G09G 3/2092 |

FOREIGN PATENT DOCUMENTS

| | | | |
|---|---|---|---|
| KR | 10-2014-0022655 | A | 2/2014 |
| KR | 10-2017-0101375 | A | 9/2017 |
| KR | 10-2020-0008683 | A | 1/2020 |

* cited by examiner

*Primary Examiner* — Van N Chow
(74) *Attorney, Agent, or Firm* — F. CHAU & ASSOCIATES, LLC

(57) ABSTRACT

A display device includes a display panel which displays an image, a data driver which provides a data voltage to the display panel, and a power management circuit which provides an analog power voltage to the data driver through an output terminal. The power management circuit measures a load current output through the output terminal, and increases a voltage level of the analog power voltage based on the load current at a first increase time point within a blank period.

23 Claims, 9 Drawing Sheets

COMPARATIVE EXAMPLE

POWER MANAGEMENT CIRCUIT AND DISPLAY DEVICE INCLUDING THE SAME

CROSS-REFERENCE TO RELATED APPLICATION(S)

This application claims priority under 35 USC § 119 to Korean Patent Application No. 10-2023-0141971, filed on Oct. 23, 2023, in the Korean Intellectual Property Office (KIPO), the entire disclosure of which is incorporated by reference herein.

BACKGROUND

1. Field

One or more embodiments described herein relate to a power management circuit and a display device including the power management circuit.

2. Description of the Related Art

A display device may include a display panel that displays an image, a data driver that provides data voltages to the display panel, and a power management circuit that provides an analog power voltage to the data driver. The data driver may include a plurality of buffers (or amplifiers) that output the data voltages, and the buffers may output the data voltages using the analog power voltage as an operating voltage (or driving voltage). The power management circuit may output the analog power voltage to the data driver through an output terminal.

Depending on the load of the output terminal from which the analog power voltage is output, a ripple may occur in the analog power voltage provided to the data driver. When the ripple occurs in the analog power voltage, the display quality of the display device may be reduced.

SUMMARY

One or more embodiments described here provide a power management circuit providing an analog power voltage with a reduced ripple.

These and/or other embodiments provide a display device with improved display quality and reduced power consumption.

A display device according to embodiments may include a display panel which displays an image, a data driver which provides a data voltage to the display panel, and a power management circuit which provides an analog power voltage to the data driver through an output terminal. The power management circuit may measure a load current output through the output terminal, and increase a voltage level of the analog power voltage based on the load current at a first increase time point within a blank period.

In an embodiment, the power management circuit may calculate a target voltage level based on a magnitude of the load current, and increase the voltage level of the analog power voltage to the target voltage level at the first increase time point.

In an embodiment, the target voltage level may increase as the magnitude of the load current increases.

In an embodiment, the power management circuit may calculate a target voltage level based on a magnitude of the load current, increase the voltage level of the analog power voltage to an intermediate voltage level lower than the target voltage level at the first increase time point, and increase the voltage level of the analog power voltage to the target voltage level at a second increase time point within the blank period after the first increase time point.

In an embodiment, the first increase time point may be after a predetermined delay time from a start time point of the blank period.

In an embodiment, the power management circuit may measure the load current in an active period before the blank period.

In an embodiment, the power management circuit includes a voltage converter which converts an input voltage receiving through an input terminal into the analog power voltage, and a load sensor which measures the load current.

In an embodiment, the voltage converter may include an inductor connected between the input terminal and a node, a first transistor connected between the node and a ground and turned-on in response to a first control signal, a second transistor connected between the node and the output terminal and turned-on in response to a second control signal, and a gate driver which generates the first control signal and the second control signal.

In an embodiment, the load sensor may include a half duty generation circuit which generates a second voltage based on a first voltage corresponding to a current flowing through the inductor, a sample and hold circuit which generates a third voltage by sampling a voltage level of the second voltage at a reference time point within a turn-on period of the second transistor, and a multiplier which generates a fourth voltage corresponding to the load current by multiplying a turn-on period of the first transistor by the third voltage.

In an embodiment, the power management circuit may further include a counter which determines the first increase time point by counting a clock signal from a start time point of the blank period.

A power management circuit according to embodiments may include a voltage converter which converts an input voltage receiving through an input terminal into an analog power voltage and provides the analog power voltage through an output terminal, and a load sensor which measures a load current output through the output terminal. The voltage converter may increase a voltage level of the analog power voltage based on the load current at a first increase time point within a blank period.

In an embodiment, the voltage converter may calculate a target voltage level based on a magnitude of the load current, and increase the voltage level of the analog power voltage to the target voltage level at the first increase time point.

In an embodiment, the target voltage level may increase as the magnitude of the load current increases.

In an embodiment, the voltage converter may calculate a target voltage level based on a magnitude of the load current, increase the voltage level of the analog power voltage to an intermediate voltage level lower than the target voltage level at the first increase time point, and increase the voltage level of the analog power voltage to the target voltage level at a second increase time point within the blank period after the first increase time point.

In an embodiment, the first increase time point may be after a predetermined delay time from a start time point of the blank period.

In an embodiment, the load sensor may measure the load current in an active period before the blank period.

In an embodiment, the voltage converter may include an inductor connected between the input terminal and a node, a first transistor connected between the node and a ground and turned-on in response to a first control signal, a second transistor connected between the node and the output terminal and turned-on in response to a second control signal, and a gate driver which generates the first control signal and the second control signal.

In an embodiment, the load sensor may include a half duty generation circuit which generates a second voltage based on a first voltage corresponding to a current flowing through the inductor, a sample and hold circuit which generates a third voltage by sampling a voltage level of the second voltage at a reference time point within a turn-on period of the second transistor, and a multiplier which generates a fourth voltage corresponding to the load current by multiplying a turn-on period of the first transistor by the third voltage.

In an embodiment, the power management circuit may further include a counter which determines the first increase time point by counting a clock signal from a start time point of the blank period In an embodiment, the voltage converter may be a boost converter.

In the power management circuit according to the embodiments, the voltage level of the analog power voltage may be increased based on the load current at the first increase time point within the blank period, so that an undershoot of the analog power voltage may be prevented from being occurred in the active period after the blank period. Accordingly, the ripple of the analog power voltage may be reduced.

In the display device according to the embodiments, the undershoot of the analog power voltage may not be occurred, so that the power consumption of the display device may be reduced. Further, the ripple of the analog power voltage may be reduced, so that the display quality of the display device may be improved.

In accordance with one or more embodiments, a power management circuit for a display device comprising an input configured to receive a signal from a load sensor; and a voltage converter configured to adjust an analog power signal output through an output terminal coupled to a data driver, wherein the voltage converter is configured to adjust the analog power signal based on the signal from the load sensor, the analog power signal adjusted by the voltage converter in a blank period of a frame to offset a change in the analog signal during an active period of the frame. The voltage converter may be configured to increase the analog power voltage in the blank period to offset a reduction in the analog power voltage in the active period. The voltage converter may be configured to increase the analog power voltage when a load of the display device is at a first level in the blank period and wherein the load of the display device is at a second level in the active period, wherein the first level is less than the second level.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
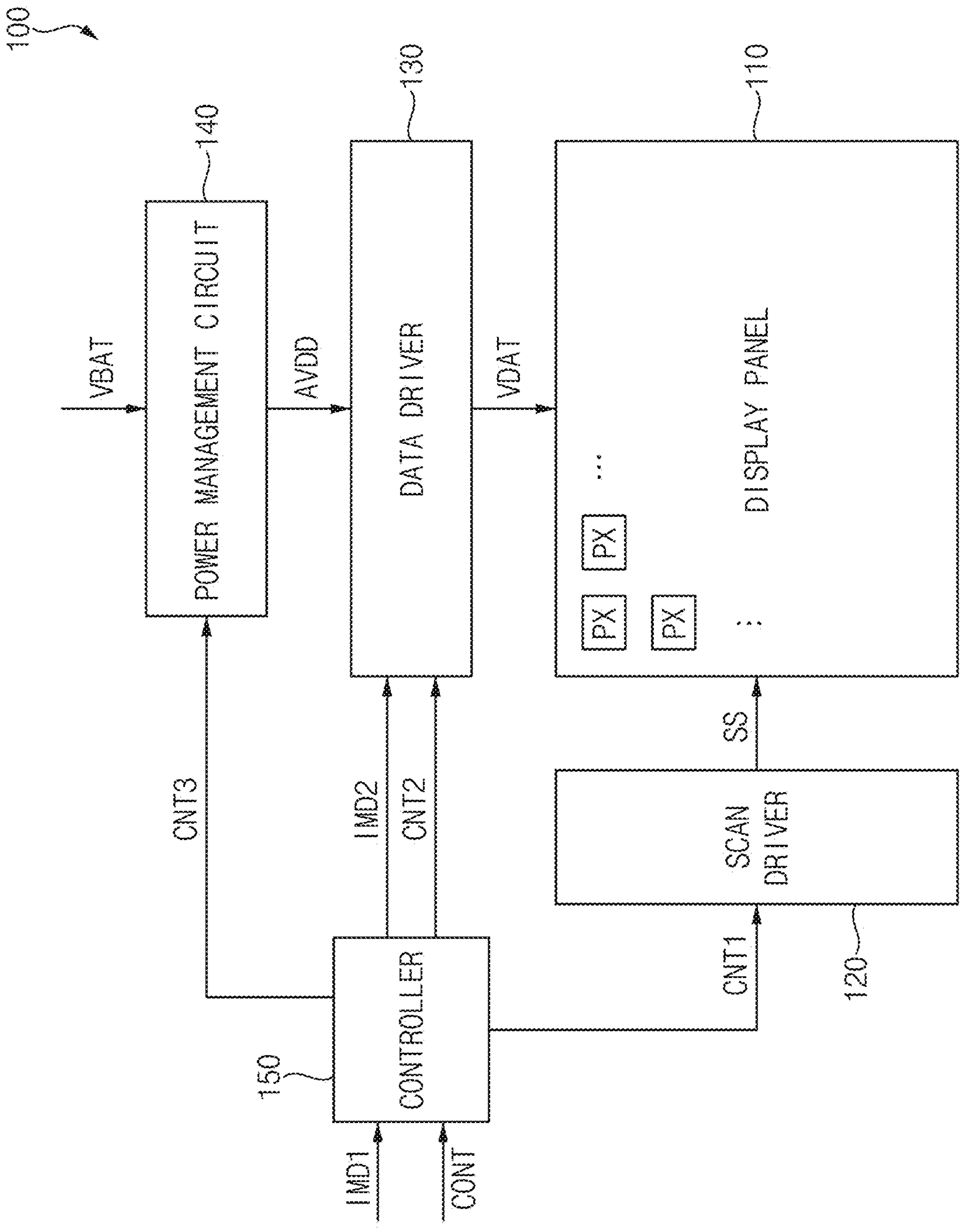
FIG. 1 is a block diagram showing a display device according to an embodiment.

Hereinafter, a display device and a power management circuit according to embodiments of the present disclosure will be described in more detail with reference to the accompanying drawings. The same or similar reference numerals will be used for the same elements in the accompanying drawings.

FIG. 1 is a block diagram showing a display device 100 according to an embodiment.

Referring to FIG. 1, the display device 100 may include a display panel 110, a scan driver 120, a data driver 130, a power management circuit 140, and a controller 150.

The display panel 110 displays images based on light output from a plurality of pixels PX. The pixels PX may receive scan signals SS and data voltages VDAT. Each of the pixels PX may emit or output light based on the scan signal SS and the data voltage VDAT.

The scan driver 120 may provide the scan signals SS to the display panel 110. The scan driver 120 may sequentially generate the scan signals SS based on a scan control signal CNT1, and sequentially provide the scan signals SS to pixel rows. The scan control signal CNT1 may include, for example, a scan start signal, a scan clock signal, etc.

The data driver 130 may provide the data voltages VDAT to the display panel 110. The data driver 130 may generate the data voltages VDAT based on second image data IMD2, a data control signal CNT2, and an analog power voltage AVDD provided from the power management circuit 140. The data voltages VDAT are provided to the pixels PX of the display panel 110. The second image data IMD2 may include grayscale values corresponding to light that is to be output from the pixels PX. The data control signal CNT2 may include, for example, an output data enable signal, a horizontal start signal, a load signal, etc. In an embodiment, the data driver 130 may include a plurality of buffers (or amplifiers) that output the data voltages VDAT.

The power management circuit 140 may provide the analog power voltage AVDD to the data driver 130 through an output terminal. The power management circuit 140 may generate the analog power voltage AVDD based on an input voltage VBAT and a power control signal CNT3. The analog power voltage AVDD may be provided to the buffers of the data driver 130. The buffers may output the data voltages VDAT using the analog power voltage AVDD as an operating voltage (or driving voltage). The input voltage VBAT may be a voltage provided from an external power source (e.g., a battery). The power control signal CNT3 may include an analog power voltage control signal (AVDD_CS in FIG. 2).

The controller 150 may control operation (or driving) of the scan driver 120, operation (or driving) of the data driver 130, and operation (or driving) of the power management circuit 140. The controller 150 may generate the scan control signal CNT1, the second image data IMD2, the data control signal CNT2, and the power control signal CNT3 based on first image data IMD1 and a controller control signal CONT. The controller 150 may provide the scan control signal CNT1 to the scan driver 120, provide the second image data IMD2 and the data control signal CNT2 to the data driver 130, and provide the power control signal CNT3 to the power management circuit 140. The first image data IMD1 may include grayscale values corresponding to light to be output from the pixels PX. The controller control signal CONT may include, for example, a vertical synchronization signal, a horizontal synchronization signal, a tearing effect signal, a global clock signal, etc.

Figure 2:
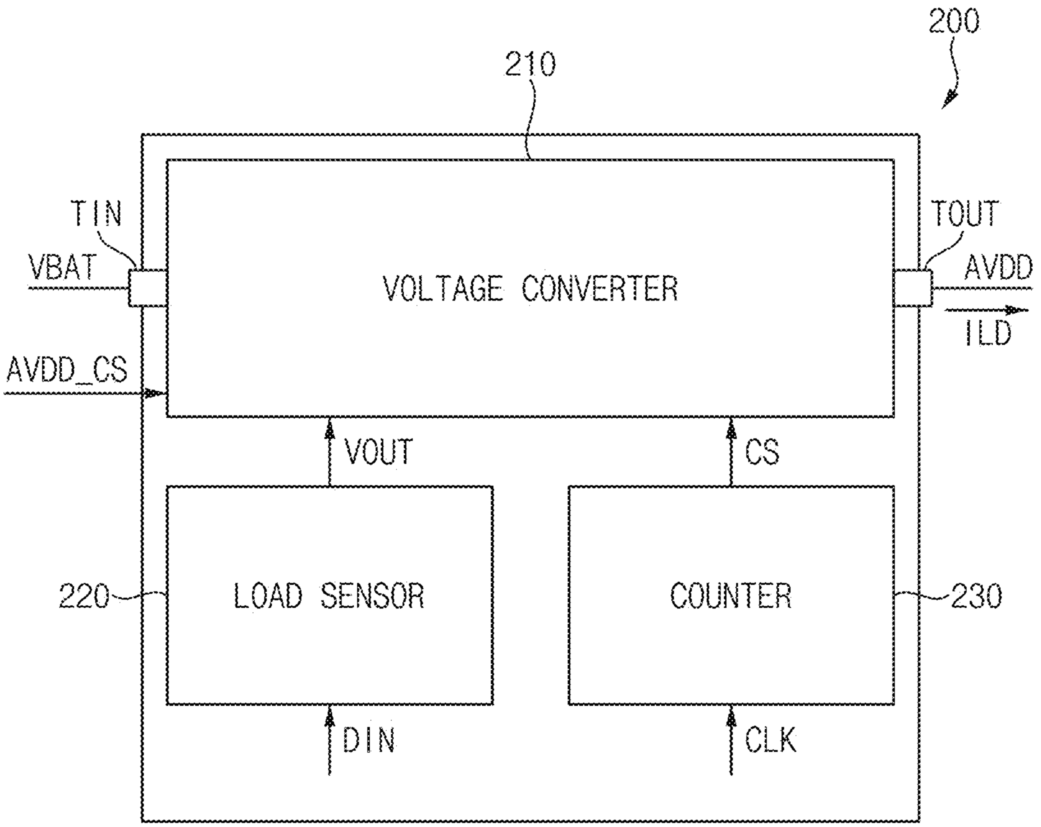
FIG. 2 is a block diagram showing a power management circuit according to an embodiment.
Figure 3:
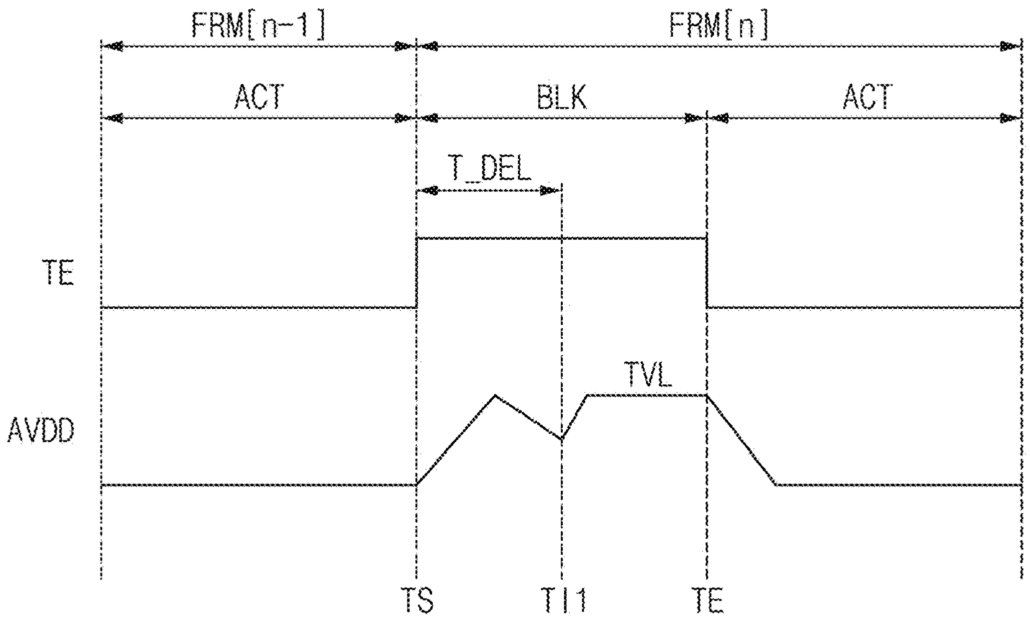
FIG. 3 is a timing diagram showing an analog power voltage according to an embodiment.

FIG. 2 is a block diagram showing a power management circuit 200 according to an embodiment. The power management circuit 200 of FIG. 2 may correspond to the power management circuit 140 included in the display device 100 of FIG. 1. FIG. 3 is a timing diagram showing an analog power voltage AVDD according to an embodiment.

Referring to FIGS. 2 and 3, the power management circuit 200 may include a voltage converter 210 and a load sensor 220. In an embodiment, the power management circuit 200 may further include a counter 230.

The voltage converter 210 may receive the input voltage VBAT through an input terminal TIN, and receive the analog power voltage control signal AVDD_CS from the controller (e.g., 150 in FIG. 1). The analog power voltage control signal AVDD_CS may correspond, for example, to the power control signal CONT3 shown in FIG. 1. The voltage converter 210 may convert the input voltage VBAT to the analog power voltage AVDD based on the analog power voltage control signal AVDD_CS. The voltage converter 210 may provide the analog power voltage AVDD through the output terminal TOUT. In an embodiment, the voltage converter 210 may provide the analog power voltage AVDD to the data driver (e.g., 130 in FIG. 1) through the output terminal TOUT.

In an embodiment, the voltage converter 210 may adjust the voltage level of the input voltage VBAT. In an embodiment, the voltage converter 210 be a boost converter. In this case, the voltage converter 210 may increase the voltage level of the input voltage VBAT, and generate the analog power voltage AVDD having a voltage level higher than the voltage level of the input voltage VBAT.

The voltage converter 210 may receive a fourth voltage VOUT corresponding to a load current ILD from the load sensor 220, and receive a control signal CS from the counter 230. The voltage converter 210 may control the voltage level of the analog power voltage AVDD based on the fourth voltage VOUT, and control an adjustment (e.g., increase) time point of the voltage level of the analog power voltage AVDD based on the control signal CS.

The load sensor 220 may measure the load current ILD output through the output terminal TOUT. The load sensor 220 may generate the fourth voltage VOUT corresponding to the load current ILD based on a first voltage DIN corresponding to a current flowing through an inductor included in the voltage converter 210, and provide the fourth voltage VOUT to the voltage converter 210. The magnitude of the load current ILD may vary depending on the magnitude of the load connected to the output terminal TOUT. The magnitude of the load current ILD may decrease when the magnitude of the load decreases, and the magnitude of the load current ILD may increase when the magnitude of the load increases. Further, the voltage level of the analog power voltage AVDD may vary depending on the magnitude of the load connected to the output terminal TOUT. In operation, the voltage level of the analog power voltage AVDD may increase when the magnitude of the load decreases, and the voltage level of the analog power voltage AVDD may decrease when the magnitude of the load increases.

In an embodiment, the voltage converter 210 may increase the voltage level of the analog power voltage AVDD based on the magnitude of the load current ILD at a first increase time point TI1 within a blank period BLK. One frame period may include the blank period BLK and an active period ACT. The data driver 130 may not output the data voltages VDAT in the blank period BLK, and output the data voltages VDAT in the active period ACT. Accordingly, the magnitude of the load connected to the output terminal TOUT in the blank period BLK may decrease, and the magnitude of the load connected to the output terminal TOUT in the active period ACT may increase. The blank period BLK may be determined by the tearing effect signal TE. The tearing effect signal TE may have a high voltage level in the blank period BLK, and have a low voltage level in the active period ACT.

In an embodiment, the voltage converter 210 may calculate a target voltage level TVL based on the magnitude of the load current ILD, and increase the voltage level of the analog power voltage AVDD to the target voltage level TVL at the first increase time point TI1. Accordingly, the voltage level of the analog power voltage AVDD may increase to the target voltage level TVL once at the first increase time point TI1. The target voltage level TVL may increase as the magnitude of the load current ILD increases, and the target voltage level TVL may decrease as the magnitude of the load current ILD decreases.

The first increase time point TI1 may occur after a predetermined delay time T_DEL from a start time point TS of the blank period BLK. As shown in FIG. 3, the delay time T_DEL may be less than an interval of the blank period BLK. In an embodiment, the counter 230 may determine the first increase time point TI1 by counting a clock signal CLK from the start time point TS of the blank period BLK. For example, the counter 230 may determine the first increase time point TI1 by counting the clock signal CLK from a time point at which a rising edge of the tearing effect signal TE occurs. The clock signal CLK may be, for example, an internal clock signal of the power management circuit 200. The counter 230 may generate the control signal CS for determining the first increase time point TI1 by counting the clock signal CLK, and provide the control signal CS to the voltage converter 210.

In an embodiment, the load sensor 220 may measure the load current ILD in the active period ACT before the blank period BLK. For example, as shown in FIG. 3, when the blank period BLK is included in an $n^{th}$ frame period FRM[n] (n is a natural number greater than or equal to 2), the load sensor 220 may measure the load current ILD in the active period ACT of an $n-1^{th}$ frame period FRM[n−1]. Accordingly, the voltage converter 210 may increase the voltage level of the analog power voltage AVDD at the first increase time point TI1 within the blank period BLK based on the load current ILD measured in the active period ACT before the blank period BLK.

Figure 4:
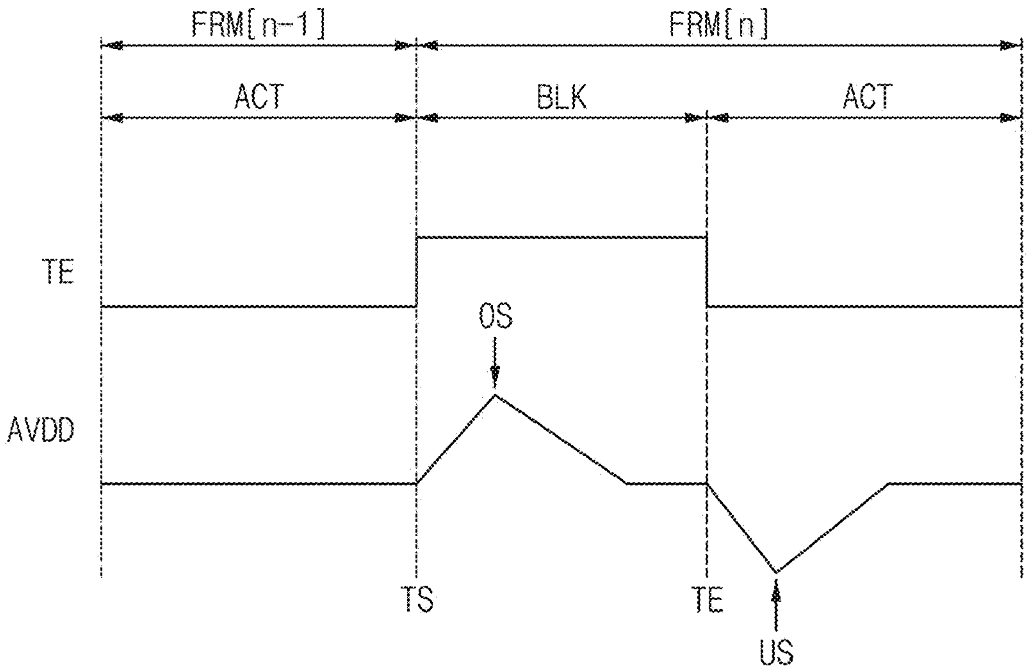
FIG. 4 is a timing diagram showing an analog power voltage according to a comparative example.

FIG. 4 is a timing diagram showing an analog power voltage AVDD according to a comparative example.

Referring to FIG. 4, when the power management circuit does not increase the voltage level of the analog power voltage AVDD within the blank period BLK, the voltage level of the analog power voltage AVDD may decrease at an end time point TE of the blank period BLK. The voltage level of the analog power voltage AVDD may vary depending on the magnitude of the load connected to the output terminal from which the analog power voltage AVDD is output. The voltage level of the analog power voltage AVDD may increase when the magnitude of the load decreases, and the voltage level of the analog power voltage AVDD may decrease when the magnitude of the load increases. Thus, the voltage level of the analog power voltage AVDD and the magnitude of the load may be inversely proportional. Since the magnitude of the load decreases as the data voltages are not output in the blank period BLK, an overshoot OS of the analog power voltage AVDD (in which the voltage level of the analog power voltage AVDD increases) may occur at the start time point TS of the blank period BLK. Further, since the magnitude of the load increases as the data voltages are output in the active period ACT, an undershoot US of the analog power voltage AVDD (in which the voltage level of the analog power voltage AVDD decreases) may occur at the end time point TE of the blank period BLK. When the overall voltage level of the analog power voltage AVDD is increased in an attempt to compensate for a decrease in the voltage level of the analog power voltage AVDD in the initial portion of the active period ACT, power consumption of the power management circuit may increase. Further, when the undershoot US of the analog power voltage AVDD occurs in the active period ACT in which the data voltages are output, a flicker of an image due to the undershoot US of the analog power voltage AVDD may occur, which may cause a deterioration in the display quality of the corresponding image.

As shown in FIG. 3, in accordance with one or more embodiments, the voltage level of the analog power voltage AVDD may be increased in the blank period BLK, e.g., at the first increase time point TI1 within the blank period BLK. As a result, the voltage level of the analog power voltage AVDD at the end time point TE of the blank period BLK may be higher than the voltage level of the analog power voltage AVDD at the start time point TS of the blank period BLK. Accordingly, undershoot US of the analog power voltage AVDD may be offset or may not occur at all in the active period ACT in which the data voltages are output.

Further, because the increased voltage level of the analog power voltage AVDD at the first increase time point TI1 is determined based on the magnitude of the load current, the voltage level of the analog power voltage AVDD may be controlled based on the magnitude of the load connected to the output terminal from which the analog power voltage AVDD is output. Accordingly, the voltage level of the analog power voltage AVDD may be greatly increased when the magnitude of the load is large to prevent undershoot US of the analog power voltage AVDD from occurring in the active period ACT. Also, the voltage level of the analog power voltage AVDD may be slightly increased when the magnitude of the load is small to reduce the power consumption of the power management circuit 200.

Figure 5:
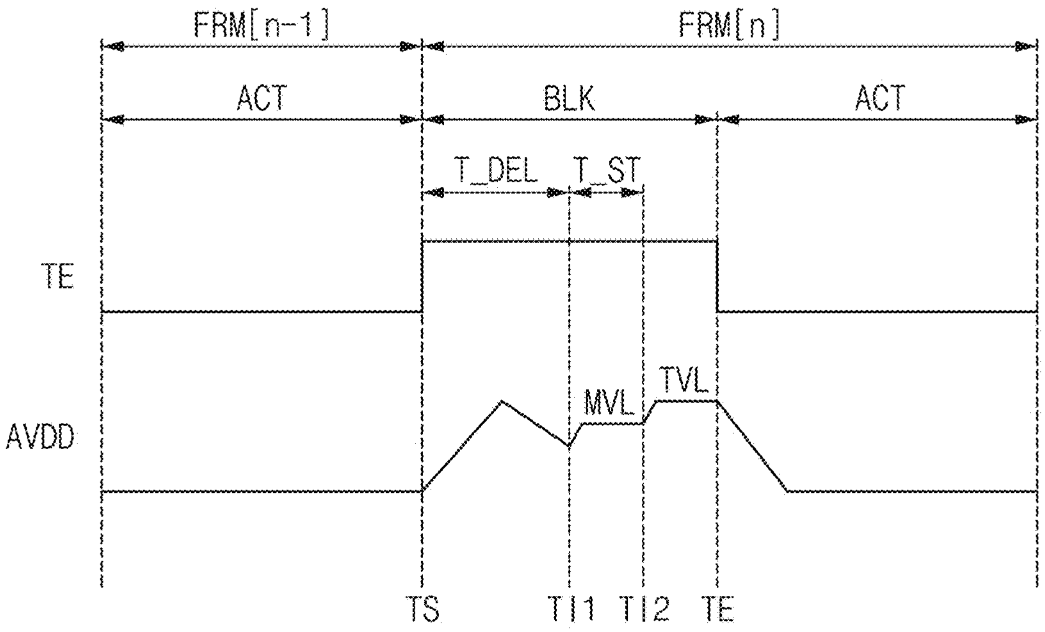
FIG. 5 is a timing diagram showing an analog power voltage according to an embodiment.

FIG. 5 is a timing diagram showing an analog power voltage AVDD according to an embodiment. Descriptions of elements and operations of the power management circuit 200 described with reference to FIGS. 2 and 5, which are substantially the same as or similar to those of the power management circuit 200 described with reference to FIGS. 2 and 3, may be omitted.

Referring to FIGS. 2 and 5, in an embodiment, the voltage converter 210 may calculate the target voltage level TVL based on the magnitude of the load current ILD, increase the voltage level of the analog power voltage AVDD to an intermediate voltage level MVL lower than the target voltage level TVL at the first increase time point TI1, and increase the voltage level of the analog power voltage AVDD to the target voltage level TVL at a second subsequent increase time point TI2 within the blank period BLK. Accordingly, the voltage level of the analog power voltage AVDD may increase stepwise (e.g., in this case, twice) to the target voltage level TVL at the first and second increase time points TI1 and TI2. Accordingly, the voltage level of the analog power voltage AVDD may smoothly increase without a sudden increase in the voltage level of the analog power voltage AVDD within the blank period BLK. Although FIG. 5 shows only two steps, the analog power voltage may be increased by more than two steps (using, for example, multiple intermediate voltage levels) in the bland period BLK in other embodiments.

In an embodiment, the second increase time point TI2 may occur after a predetermined step time T_ST from the first increase time point TI1. The step time T_ST may be smaller than an interval between the first increase time point TI1 and the end time point TE of the blank period BLK. In an embodiment, the counter 230 may determine the first increase time point TI1 and the second increase time point TI2 by counting the clock signal CLK from the start time point TS of the blank period BLK. For example, the counter 230 may determine the first increase time point TI1 and the second increase time point TI2 by counting the clock signal CLK from a time point at which a rising edge of the tearing effect signal TE occurs. The counter 230 may generate the control signal CS for determining the first and second increase time points TI1 and TI2 by count the clock signal CLK, and provide the control signal CS to the voltage converter 210.

Figure 6:
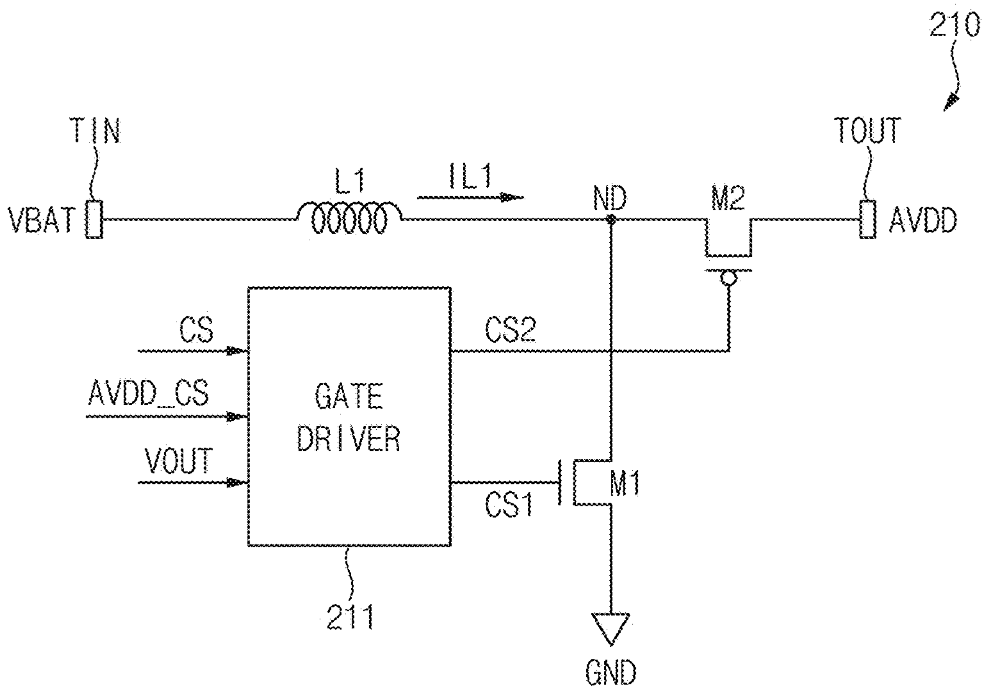
FIG. 6 is a view showing an example of a voltage converter included in the power management circuit of FIG. 2 according to an embodiment.
Figure 7:
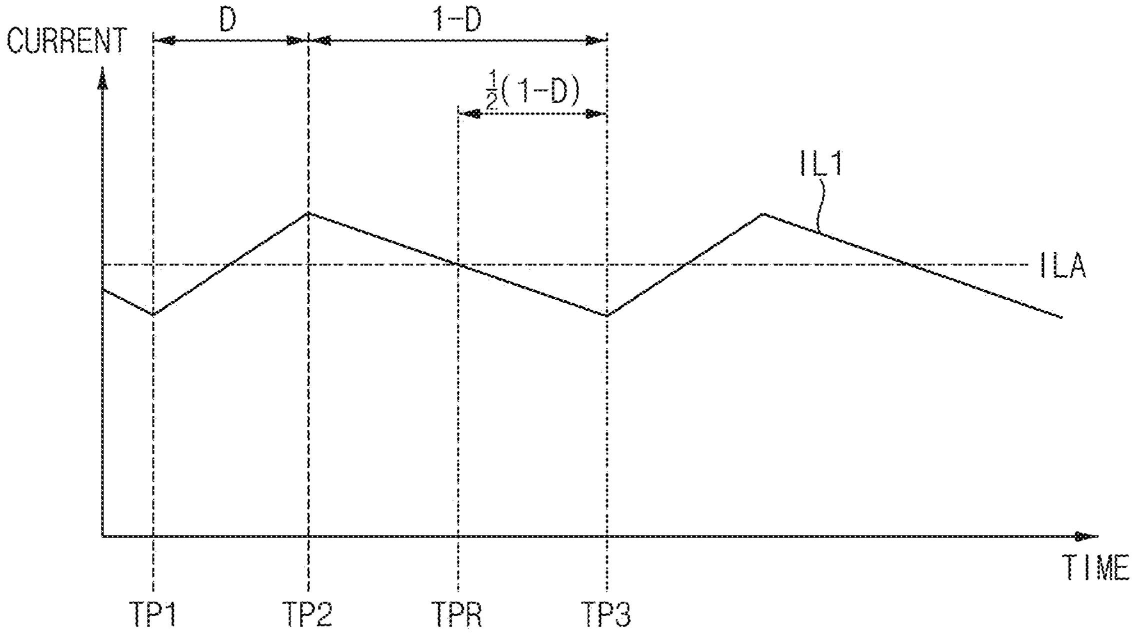
FIG. 7 is a timing diagram showing a current flowing through an inductor included in the voltage converter of FIG. 6 according to an embodiment.

FIG. 6 is a view showing an example of a voltage converter 210 included in the power management circuit 200 of FIG. 2. FIG. 7 is a timing diagram showing a current IL1 flowing through an inductor L1 included in the voltage converter 210 of FIG. 6.

Referring to FIGS. 6 and 7, the voltage converter 210 may include an inductor L1, a first transistor M1, a second transistor M2, and a gate driver 211. However, the voltage converter 210 may have a different configuration in other embodiments.

The inductor L1 may be connected between the input terminal TIN and a node ND. An inductor current IL1 may flow through the inductor L1. The voltage level of the analog power voltage AVDD may be controlled based on the inductor current IL1.

The first transistor M1 may be connected between the node ND and a ground GND, and turned on in response to a first control signal CS1. The first transistor M1 may include a gate electrode that receives the first control signal CS1, a first electrode connected to the node ND, and a second electrode connected to the ground GND. The first transistor M1 may control the inductor current IL1 to flow through the inductor L1.

The second transistor M2 may be connected between the node ND and the output terminal TOUT, and turned on in response to a second control signal CS2. The second transistor M2 may include a gate electrode that receives the second control signal CS2, a first electrode connected to the node ND, and a second electrode connected to the output terminal TOUT. The second transistor M2 may control the inductor current IL1 to flow through the inductor L1. The second transistor M2 may be turned on alternately with the first transistor M1, for example, as a result of the first and second transistors having different conductivities. For example, the second transistor M2 may be turned on after the first transistor M1 is turned on and electromotive force is generated in the inductor L1, so that a voltage at the node ND may be converted to the analog power voltage AVDD.

In an embodiment, as indicated above, the first transistor M1 and the second transistor M2 may be transistors of different types. For example, the first transistor M1 may be an N-type transistor (e.g., NMOS transistor), and the second transistor M2 may be a P-type transistor (e.g., PMOS transistor). In another embodiment, the first transistor M1 and the second transistor M2 may be transistors of the same type.

The gate driver 211 may generate the first control signal CS1 and the second control signal CS2 based on the analog power voltage control signal AVDD_CS, the fourth voltage VOUT, and the control signal CS. The first control signal CS1 may have a turn-on voltage level in a first period D (e.g., see FIG. 7) between a first time point TP1 and a second time point TP2, and have a turn-off voltage level in a second period 1-D between the second time point TP2 and a third time point TP3. As the first transistor M1 is turned on and the second transistor M2 is turned off in the first period D, a magnitude of the inductor current IL1 may increase in the first period D. The second control signal CS2 may have a turn-off voltage level in the first period D, and have a turn-on voltage level in the second period 1-D. As the first transistor M1 is turned off and the second transistor M2 is turned on in the second period 1-D, the magnitude of the inductor current IL1 may decrease in the second period 1-D. As the magnitude of the inductor current IL1 repeatedly increases and decreases depending on a duty ratio of the first period D and the second period 1-D, the voltage level of the analog power voltage AVDD may repeatedly increase and decrease in a corresponding manner.

The average magnitude ILA of the inductor current IL1 may be substantially equal to a magnitude of the inductor current IL1 at a reference time point TPR at which ½ of the second period 1-D has passed.

Figure 8:
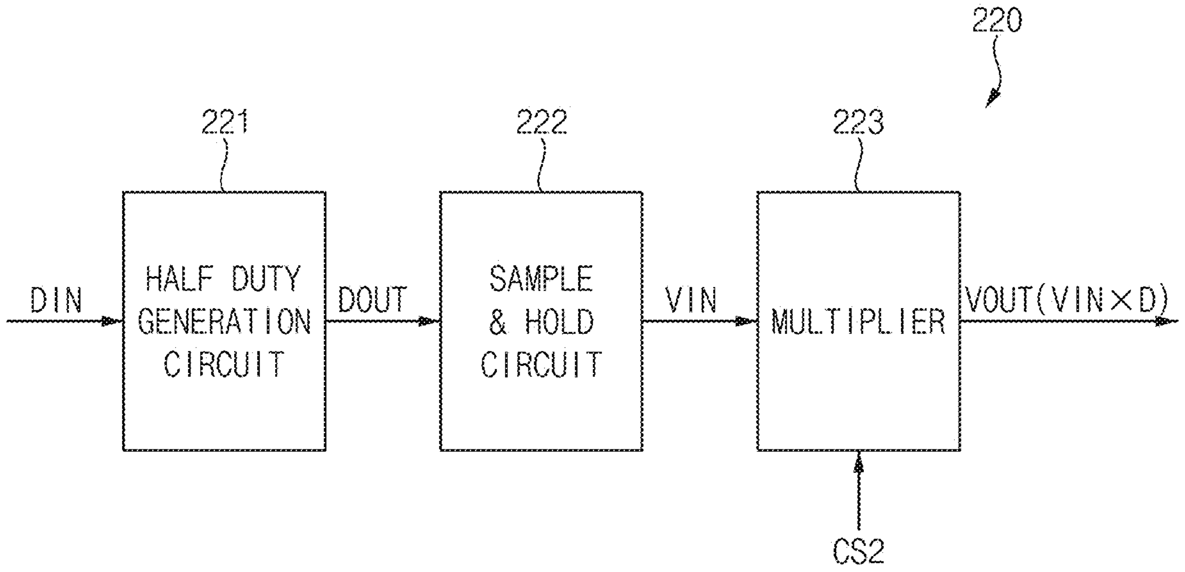
FIG. 8 is a view showing an example of a load sensor included in the power management circuit of FIG. 2.
Figure 9:
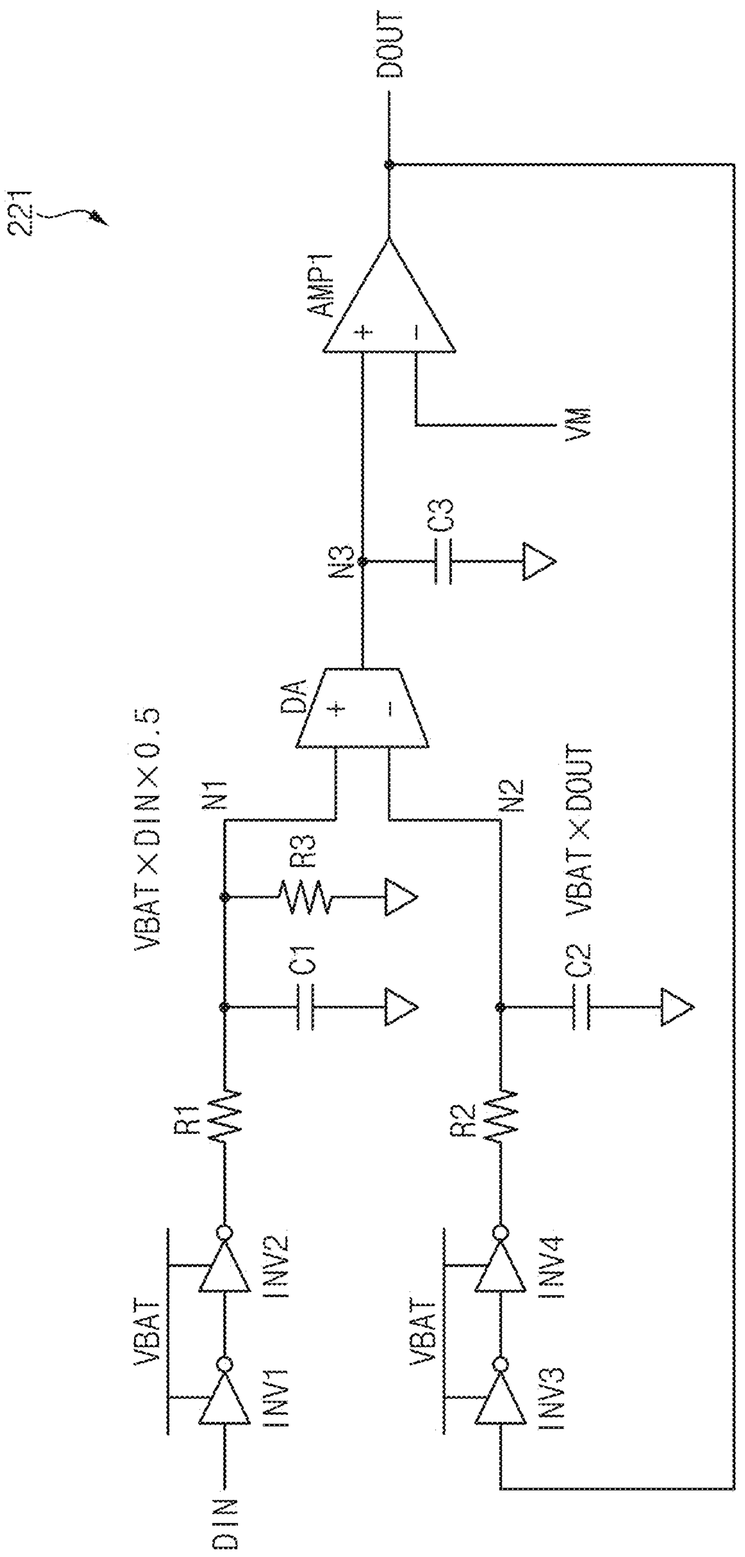
FIG. 9 is a circuit diagram showing an example of a half duty generation circuit included in the load sensor of FIG. 8 according to an embodiment.
Figure 10:
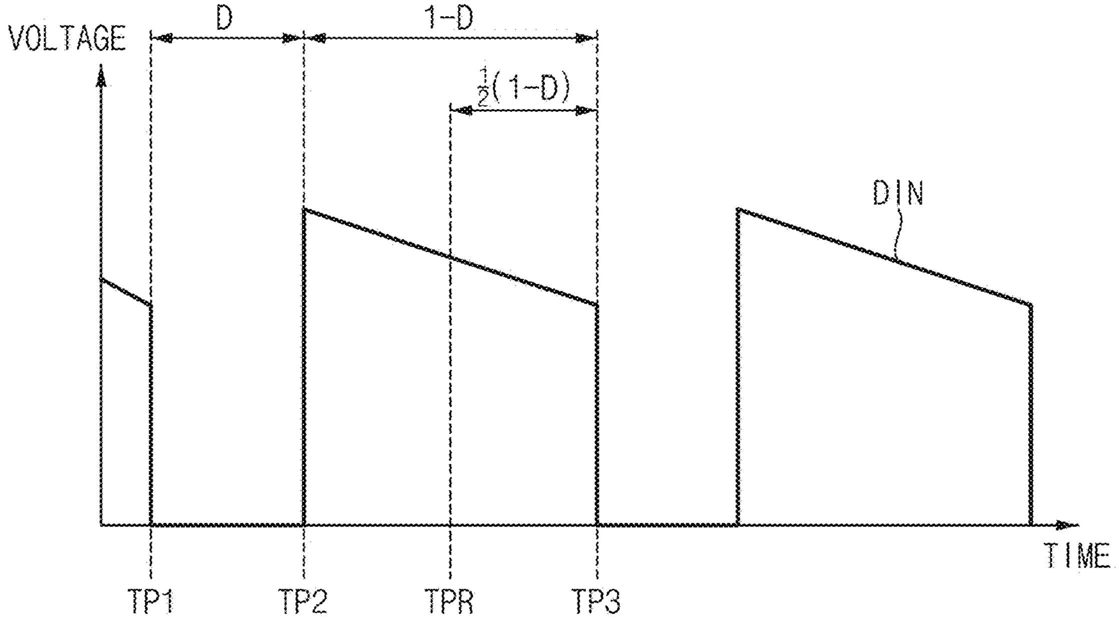
FIG. 10 is a timing diagram showing a first voltage provided to the half duty generation circuit of FIG. 9 according to an embodiment.
Figure 11:
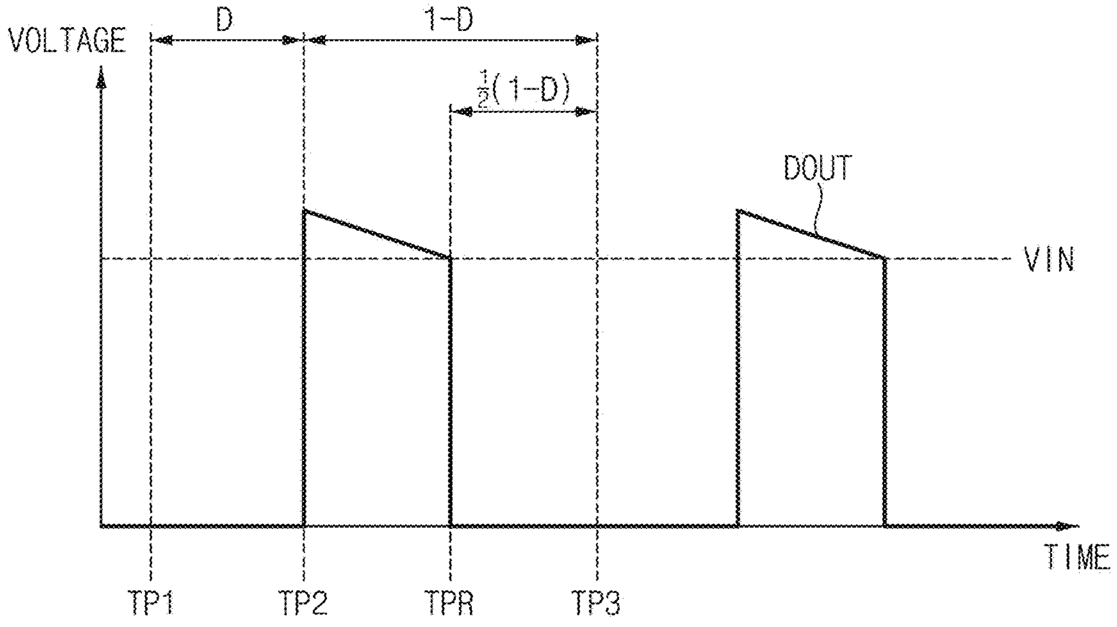
FIG. 11 is a timing diagram showing a second voltage provided to a sample and hold circuit included in the load sensor of FIG. 8 according to an embodiment.
Figure 12:
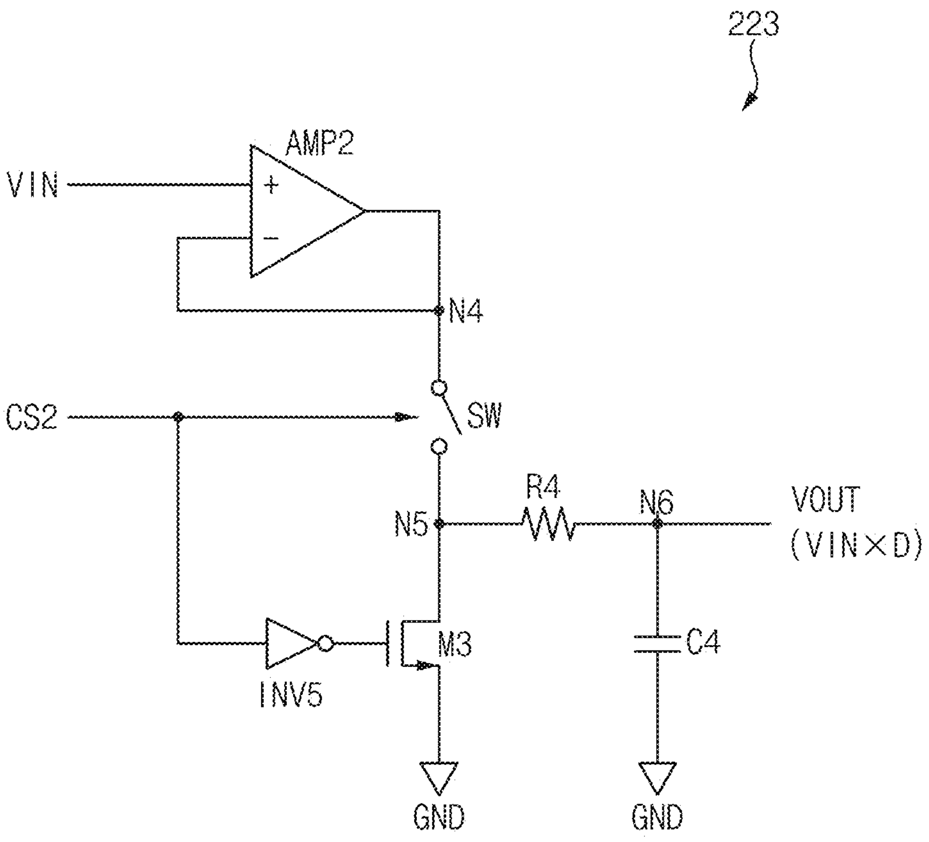
FIG. 12 is a circuit diagram showing an example of a multiplier included in the load sensor of FIG. 8.

FIG. 8 is a view showing an example of the load sensor 220 included in the power management circuit 200 of FIG. 2. FIG. 9 is a circuit diagram showing an example of a half duty generation circuit 221 included in the load sensor 220 of FIG. 8. FIG. 10 is an example of a timing diagram showing a first voltage DIN provided to the half duty generation circuit 221 of FIG. 9. FIG. 11 is an example of a timing diagram showing a second voltage DOUT provided to a sample and hold circuit 222 included in the load sensor 220 of FIG. 8. FIG. 12 is a circuit diagram showing an example of a multiplier 223 included in the load sensor 220 of FIG. 8 according to an embodiment.

Referring to FIGS. 6 to 12, the load sensor 220 may include a half duty generation circuit 221, a sample and hold circuit 222, and a multiplier 223. The load sensor 220 may have a different configuration in another embodiment.

The half duty generation circuit 221 may generate a second voltage DOUT based on the first voltage DIN corresponding to the current IL1 flowing through the inductor L1. In an embodiment, the first voltage DIN may be a voltage between opposite terminals of the second transistor M2 (e.g., between the node ND and the output terminal TOUT). Accordingly, the first voltage DIN may have a voltage level of 0 in the first period D, and have a voltage level corresponding to the inductor current IL1 in the second period 1-D.

As shown in FIG. 9, the half duty generation circuit 221 may include a first inverter INV1, a second inverter INV2, a first resistor R1, a first capacitor C1, a third resistor R3, a third inverter INV3, a fourth inverter INV4, a second resistor R2, a second capacitor C2, a differential amplifier DA, a third capacitor C3, and a first amplifier AMP1. The half duty generation circuit 221 may have a different configuration in another embodiment.

The first inverter INV1 and the second inverter INV2 may transmit the first voltage DIN using the input voltage VBAT as an operating voltage (or driving voltage). The first resistor R1 may be connected between an output terminal of the second inverter INV2 and a first node N1. The first capacitor C1 may be connected between the first node N1 and a reference potential, e.g., ground. The third resistor R3 may be connected between the first node N1 and the ground. A voltage of the first node N1 may correspond to a value obtained by multiplying the input voltage VBAT, the first voltage DIN, and a predetermined value, e.g., a value of 0.5.

The third inverter INV3 and the fourth inverter INV4 may transmit the second voltage DOUT (serving as a feedback voltage) using the input voltage VBAT as an operating voltage (or driving voltage). The second resistor R2 may be connected between an output terminal of the fourth inverter INV4 and a second node N2. The second capacitor C2 may be connected between the second node N2 and the a reference potential, e.g., ground. A voltage of the second node N2 may correspond to a value obtained by multiplying the input voltage VBAT and the second voltage DOUT.

The differential amplifier DA may output a voltage difference between the voltage of the first node N1 and the voltage of the second node N2 to a third node N3. The third capacitor C3 may be connected between the third node N3 and the ground. The first amplifier AMP1 may output the second voltage DOUT corresponding to the difference between a voltage of the third node N3 applied to a non-inverting terminal and a reference voltage VM applied to an inverting terminal.

The sample and hold circuit 222 may generate a third voltage VIN by sampling a voltage level of the second voltage DOUT at the reference time point TPR within the turn-on period of the second transistor M2. The turn-on period of the second transistor M2 may be, for example, the second period 1-D. Since the magnitude of the inductor current IL1 at the reference time point TPR corresponds to the average magnitude ILA of the inductor current IL1, the voltage level of the third voltage VIN may be an average voltage level of the first voltage DIN within the second period 1-D. Accordingly, the voltage level of the third voltage VIN may correspond to the average magnitude ILA of the inductor current IL1.

The multiplier 223 may generate the fourth voltage VOUT corresponding to the load current ILD by multiplying the third voltage VIN by a turn-on period of the first transistor M1. The turn-on period of the first transistor M1 may be the first period D.

The multiplier 223 may include a second amplifier AMP2, a switch SW, a fifth inverter INV5, a third transistor M3, a fourth resistor R4, and a fourth capacitor C4. The multiplier 223 may have a different configuration in another embodiment.

A non-inverting terminal of the second amplifier AMP2 may receive the third voltage VIN, an output terminal of the second amplifier AMP2 may be connected to a fourth node N4, and an inverting terminal of the second amplifier AMP2 may be connected to the output terminal of the second amplifier AMP2. The switch SW may be connected between the fourth node N4 and a fifth node N5. The switch SW may be turned on in response to the second control signal CS2. The fifth inverter INV5 may invert the second control signal CS2. The third transistor M3 may be connected between the fifth node N5 and ground GND, and turned on in response to the inverted second control signal CS2. The fourth resistor R4 may be connected between the fifth node N5 and a sixth node N6. The fourth capacitor C4 may be connected between the sixth node N6 and the ground GND. A voltage of the sixth node N6 may correspond to the fourth voltage VOUT, and the fourth voltage VOUT may correspond to a value obtained by multiplying the third voltage VIN and the first period D.

Figure 13:
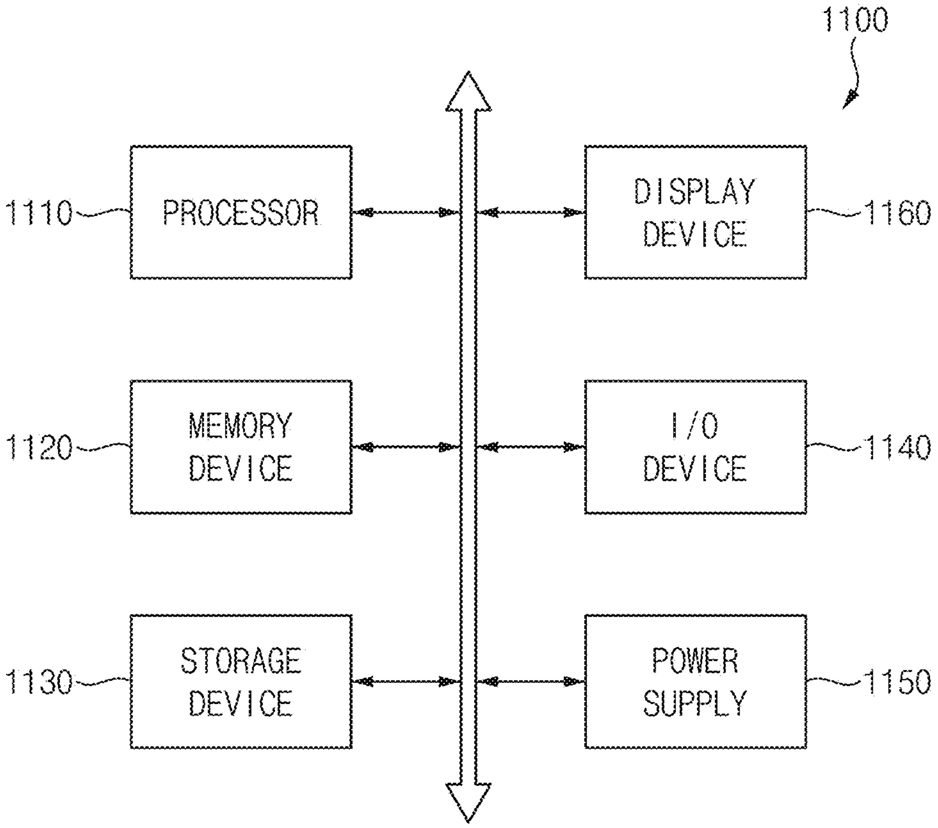
FIG. 13 is a block diagram showing an electronic apparatus according to an embodiment.

FIG. 13 is a block diagram showing an electronic apparatus 1100 according to an embodiment.

Referring to FIG. 13, the electronic apparatus 1100 may include a processor 1110, a memory device 1120, a storage device 1130, an input/output (I/O) device 1140, a power supply 1150, and a display device 1160. The electronic apparatus 1100 may further include a plurality of ports capable of communicating with a video card, a sound card, a memory card, a USB device, and the like, or communicating with other systems.

The processor 1110 may perform specific calculations or tasks. In an embodiment, the processor 1110 may be a microprocessor, a central processing unit (CPU), or the like. The processor 1110 may be connected to other components through an address bus, a control bus, a data bus, and the like. In an embodiment, the processor 1110 may also be connected to an expansion bus such as a peripheral component interconnect (PCI) bus. In an embodiment, the processor 1110 may provide first image data (IMD1 of FIG. 1) and a controller control signal (CONT of FIG. 1) to the display device 1160.

The memory device 1120 may store data to be used for an operation of the electronic apparatus 1100. For example, the memory device 1120 may include: a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as a dynamic random access memory (DRAM), a static random access memory (SRAM), or a mobile DRAM.

The storage device 1130 may include a solid state drive (SSD), a hard disk drive (HDD), a CD-ROM, and the like. The I/O device 1140 may include: an input device such as a keyboard, a keypad, a touch pad, a touch screen, or a mouse; and an output device such as a speaker or a printer. The power supply 1150 may supply a power required for the operation of the electronic apparatus 1100. In an embodiment, the power supply 1150 may provide an input voltage (VBAT of FIG. 1) to the display device 1160. The display device 1160 may be connected to other components through the buses or other communication links. The display device 1160 may correspond to the display device 100 of FIG. 1.

In a power management circuit included in the display device 1160, a voltage level of an analog power voltage may be increased based on a load current at a first increase time point within a blank period. As a result, undershoot of the analog power voltage may be partially offset or completely prevented from occurring in an active period after the blank period. Accordingly, the formation of a ripple of the analog power voltage may be reduced or prevented. Further, in the display device 1160, undershoot of the analog power voltage may not occur, so that power consumption of the display device 1160 may be reduced. Further, the ripple of the analog power voltage may be reduced or prevented, so that a display quality of the display device may be improved.

The display device according to the embodiments may be applied to a display device included in a computer, a notebook, a mobile phone, a smart phone, a smart pad, a smart watch, a PMP, a PDA, an MP3 player, or the like.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, multiplexers, amplifiers, circuits, drivers, counters, converters, and other signal generating and signal processing features of the embodiments disclosed herein may be implemented, for example, in non-transitory logic that may include hardware, software, or both. When implemented at least partially in hardware, the controllers, processors, devices, multiplexers, amplifiers, circuits, drivers, counters, converters, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit. In some embodiments, these features may be implemented by a neural network, machine-learning logic, or other form of artificial intelligence.

When implemented in at least partially in software, the controllers, processors, devices, multiplexers, amplifiers, circuits, drivers, counters, converters, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Although the display devices and the power management circuits according to the embodiments have been described with reference to the drawings, the illustrated embodiments are examples, and may be modified and changed by a person having ordinary knowledge in the relevant technical field without departing from the technical spirit described in the following claims. The embodiments may be combined to form additional embodiments.

What is claimed is:

1. A display device, comprising:
- a display panel configured to display an image;
- a data driver configured to provide a data voltage to the display panel; and
- a power management circuit configured to generate an analog power voltage and to provide the analog power voltage to the data driver through an output terminal,
- wherein the power management circuit is configured to measure a magnitude of a load current output through the output terminal and increase a voltage level of the analog power voltage output to the data driver based on the magnitude of the measured load current at a first increase time point within a blank period.

2. The display device of claim 1, wherein the power management circuit is configured to:
- calculate a target voltage level based on the magnitude of the load current, and
- increase the voltage level of the analog power voltage to the target voltage level at the first increase time point.

3. The display device of claim 2, wherein the target voltage level increases as the magnitude of the load current increases.

4. The display device of claim 1, wherein the power management circuit is configured to:
- calculate a target voltage level based on the magnitude of the load current,
- increase the voltage level of the analog power voltage to an intermediate voltage level lower than the target voltage level at the first increase time point, and
- increase the voltage level of the analog power voltage to the target voltage level at a second increase time point within the blank period after the first increase time point.

5. The display device of claim 1, wherein the first increase time point is after a predetermined delay time from a start time point of the blank period.

6. The display device of claim 1, wherein the power management circuit is configured to measure the load current in an active period before the blank period.

7. The display device of claim 1, wherein the power management circuit includes:
- a voltage converter configured to convert an input voltage received through an input terminal to the analog power voltage; and
- a load sensor configured to measure the magnitude of the load current and provide a voltage signal to the voltage converter corresponding to the magnitude of the measured load current, wherein the voltage converter may be further configured to control the voltage level of the analog power voltage based on the voltage signal received from the load sensor.

8. The display device of claim 7, wherein the voltage converter includes:
- an inductor connected between the input terminal and a node;
- a first transistor connected between the node and a reference potential and configured to turn-on in response to a first control signal;
- a second transistor connected between the node and the output terminal and configured to turn-on in response to a second control signal; and
- a gate driver configured to generate the first control signal and the second control signal.

9. The display device of claim 8, wherein the load sensor includes:
- a half duty generation circuit configured to generate a second voltage based on a first voltage corresponding to a current flowing through the inductor;
- a sample and hold circuit configured to generate a third voltage by sampling a voltage level of the second voltage at a reference time point within a turn-on period of the second transistor; and
- a multiplier configured to generate a fourth voltage corresponding to the load current by multiplying a turn-on period of the first transistor by the third voltage.

10. The display device of claim 7, wherein the power management circuit further includes:
- a counter configured to determine the first increase time point by counting a clock signal from a start time point of the blank period.

11. A power management circuit, comprising:
- a voltage converter configured to convert an input voltage received through an input terminal to an analog power voltage, and to provide the analog power voltage through an output terminal; and
- a load sensor configured to measure a magnitude of a load current output through the output terminal, wherein the voltage converter is configured to increase a voltage level of the analog power voltage at a first increase time point within a blank period based on the magnitude of the measured load current.

12. The power management circuit of claim 11, wherein the voltage converter is configured to:
- calculate a target voltage level based on the magnitude of the load current, and
- increase the voltage level of the analog power voltage to the target voltage level at the first increase time point.

13. The power management circuit of claim 12, wherein the target voltage level increases as the magnitude of the load current increases.

14. The power management circuit of claim 11, wherein the voltage converter is configured to:
- calculate a target voltage level based on the magnitude of the load current,
- increase the voltage level of the analog power voltage to an intermediate voltage level lower than the target voltage level at the first increase time point, and
- increase the voltage level of the analog power voltage to the target voltage level at a second increase time point within the blank period after the first increase time point.

15. The power management circuit of claim 11, wherein the first increase time point is after a predetermined delay time from a start time point of the blank period.

16. The power management circuit of claim 11, wherein the load sensor is configured to measure the load current in an active period before the blank period.

17. The power management circuit of claim 11, wherein the voltage converter includes:

an inductor connected between the input terminal and a node;

a first transistor connected between the node and a reference potential and configured to turn-on in response to a first control signal;

a second transistor connected between the node and the output terminal and configured to turn-on in response to a second control signal; and a gate driver configured to generate the first control signal and the second control signal.

18. The power management circuit of claim 17, wherein the load sensor includes:

a half duty generation circuit configured to generate a second voltage based on a first voltage corresponding to a current flowing through the inductor;

a sample and hold circuit configured to generate a third voltage by sampling a voltage level of the second voltage at a reference time point within a turn-on period of the second transistor; and a multiplier configured to generate a fourth voltage corresponding to the load current by multiplying a turn-on period of the first transistor by the third voltage.

19. The power management circuit of claim 11, further comprising:

a counter configured to determine the first increase time point by counting a clock signal from a start time point of the blank period.

20. The power management circuit of claim 11, wherein the voltage converter includes a boost converter.

21. A power management circuit for a display device, comprising:

an input configured to receive a signal from a load sensor; and a voltage converter configured to adjust an analog power signal output through an output terminal coupled to a data driver, wherein the voltage converter is configured to adjust the analog power signal based on the signal from the load sensor, the analog power signal adjusted by the voltage converter in a blank period of a frame to offset a change in the analog signal during an active period of the frame.

22. The power management circuit of claim 21, wherein the voltage converter is configured to increase the analog power voltage in the blank period to offset a reduction in the analog power voltage in the active period.

23. The power management circuit of claim 22, wherein the voltage converter is configured to increase the analog power voltage when a load of the display device is at a first level in the blank period and wherein the load of the display device is at a second level in the active period, wherein the first level is less than the second level.

* * * * *